3,616,721
WIND GENERATOR FOR MUSICAL INSTRU-
MENTS, IN PARTICULAR PIPE ORGANS,
AND A SOUND DAMPER THEREFOR
Otto Laukhuff, Weikersheim, Germany, assignor to
August Laukhuff, Weikersheim, Germany
Filed Feb. 12, 1969, Ser. No. 798,629
Claims priority, application Germany, Feb. 17, 1968,
P 16 22 155.9
Int. Cl. G10b 3/02
U.S. Cl. 84—355                                9 Claims

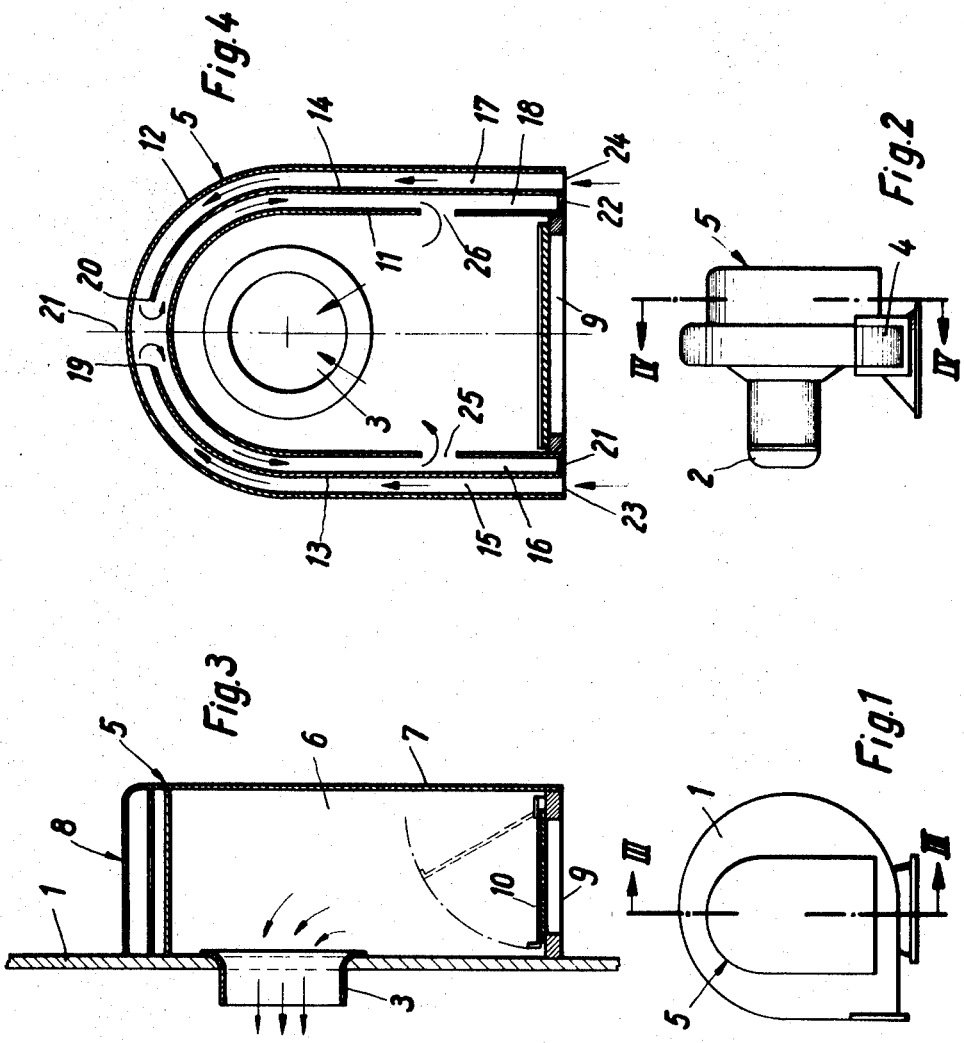

ABSTRACT OF THE DISCLOSURE

A wind generator for musical instruments particularly pipe organs comprises a sound damper arranged in front of the air intake of the wind generator. The damper comprises a housing the interior of which communicates with the wind generator intake, and the damper itself comprises an air intake which is provided with a flap or similar obturating element, which can be moved from a closed condition under the effect of air flow produced in the damper housing, into a condition in which the damper air intake is uncovered to a greater or lesser extent. The housing wall of the damper has, at least locally, a double-wall construction and defines one or more secondary flow ducts which communicate freely with the atmosphere. The obturating element has a preload acting in the direction of closure which prevents it from opening until a predetermined vacuum level is produced in the interior of the damper housing.

PRIOR APPLICATION

Priority, Germany, Feb. 17, 1968, application No. P 16 22 155.9 (L 58 619 IXa/51a).

The present invention relates to wind generators (fans) for musical instruments, and in particular, but not exclusively, pipe organs, there being a sound-damper arranged in front of the intake of the wind generator said damper taking the form of a housing the interior of which communicates with the wind generator intake and whose own air intake is provided with a flap or similar obturating element, which can be moved from a closed position under the effect of an airflow produced in the damper housing by the wind generator, into a position which uncovers the air intake opening to a greater or lesser extent.

In wind generators of this kind the effort is towards achieving the least possible noise level in order that noises produced by the generator do not interfere with the sounds produced by the musical instrument. The design of the wind generator itself, which incorporates a fan housing and a blower fan generally driven by an electric motor, is based on reducing noise development to a minimum and in particular on avoiding the occurrence of mechanical noise from bearings etc. To a certain extent, however, noises which are created by the airflow produced by the blower fan, are unavoidable. This kind of noise in particular includes the noise produced by the air entering the intake of the wind generator, that is to say the noise which the inflowing air produces in passing said intake opening and in passing over the blades of the blower fan etc. In order to reduce this wind noise, sound-dampers are provided in the manner described hereinabove, the damper housings of which are arranged in front of the intake sides of the wind generators and surround and cover the intake openings thereof. In known sound-dampers, the damper housing contains its own air intake opening which is normally closed off by a flap or similar obturating element. This obturating element opens as soon as the wind generator starts to operate and develops a vacuum and airflow inside the sound-damper housing. Depending upon the level of the vacuum and the quantity and speed of the air displaced by the wind generator, the obturating element will open to a greater or lesser extent. The movable obturating element of the sound-damper supplements the sound-damping action of the screening damper housing, since it contributes towards preventing noises generated at the intake orifice of the wind generator from penetrating directly outside. The sound-damping effect of the obturating element reduces as soon as it opens at all and continues to fall off with progressive further opening.

In the known wind generators equipped with sound-dampers, the obturating element has a very high response sensitivity and executes an opening movement even at very small airflows. Because, in practice, every installation has a certain degree of leakage, i.e. a certain false draught, the movable obturating element does not generally completely close off the air intake orifice in the damper housing even when the wind generator is not operating. Because of this air or wind loss, the extent of which depends upon how airtight the ducting involved in the air supply system is, there is, therefore, a continuous airflow which opens the obturating element to a greater or lesser extent and allows any air or wind noises which are generated to penetrate and become audible in the environment. Even relatively low-amplitude noises of this kind are a source of disturbance when the sounds produced by the musical instrument proper, for example the pipe organ, are so pianissimo that they cannot completely mask the background noise produced by the wind generator installation. Background noises of this kind are particularly disturbing during rests, when the musical instrument is producing no sound at all and there is an expectant silence in the surrounding environment, for example, concert halls, churches etc.

It is an object of the invention to improve the sound-damping in respect of background or secondary noises which are produced by a wind generator, and to reduce the level of these secondary noises to such an extent that they no longer have any disturbing effect even in particularly critical situations. To this end, the housing wall of the sound damper is given, at least locally, a double-walled design and delimits one or more additional secondary flow ducts which allow the interior of the housing to communicate freely with the exterior, and the obturating element is given a preload acting in the direction of closure and preventing it from opening until a certain predetermined vacuum level is produced in the interior of the housing. This design ensures that where the air requirement is low, as for example when only a small number of registers of a pipe organ are being used, and with a low airflow in the damper housing, the obturating element remains closed and does not open until the vacuum inside the sound-damper housing has reached a corresponding level, in accordance with an increased air requirement as for example when large numbers of registers are involved. When the air requirement is low, on the other hand, and there is a correspondingly low vacuum inside the damper housing, the requisite air flows through the secondary ducts into the damper housing. In this context, the air flowing into the secondary ducts whose cross-sections are not controlled by any flaps or similar elements, meets no appreciable resistance and thus produces no appreciable level of noise when flowing through said ducts. The secondary ducts on the other hand ensure that noises produced in or stemming from the other part of the installation do not penetrate outside and become disturbingly audible. The secondary air ducts themselves have a high sound-damping capacity and exclude any direct transmission of sound waves from the damper housing. If the obturating element opens, however, to accord with a correspondingly high air requirement, then the musical instrument will be producing sounds of such high intensity anyway, that any secondary noises penetrating directly outside through the air intake of the damper housing will be masked. The structure of the secondary air duct or ducts delimited by the double-walled portion of the damper housing, will preferably be extended by means of built-in partition walls. In this context, in order to improve sound-damping in accordance with the invention, the secondary air ducts can be given a serpentine or labyrinthine design.

The damper housing is conveniently in the form of a box open at one side, with the open side facing the housing of the wind generator in the region of the intake thereof and indeed closes off said generator, a wall section of the box which is disposed normally in relation to the housing wall of the wind generator having a U-shaped contour and being arranged as the double-walled portion delimiting the secondary air ducts, and the air intake orifice controlled by the obturating element being disposed horizontally between the ends of the downward-pointing legs of U-section profile of the double-walled zone. The obturating element can take the form of a weighted flap and will conveniently be arranged at the side of the air intake orifice facing the interior of the housing. Instead of this, however, it is equally conceivable to provide a weighted or spring-loaded diaphragm or the like as the obturating element. The secondary air ducts can be arranged in the double-walled zone in a disposition which is symmetrical vis-a-vis the transverse central plane of the damper housing. Furthermore, preferably all the flow-delimiting surfaces of the sound-damping housing will be made of sound-damping material or be lined with such material.

An example of the subject of the invention has been schematically illustrated in the drawing in greater detail and:

FIG. 1 illustrates an end elevation of the wind generator embodying the invention by way of example, FIG. 2 illustrates a side elevation of FIG. 1, FIG. 3 is a section on the line III—III of FIG. 1, and FIG. 4 is a section on the line IV—IV of FIG. 2.

The wind generator comprises a fan housing 1 in which a blower fan (not illustrated in detail) is located and this is driven by an electric motor 2; details of the fan do not per se form part of the present invention. Blower fans for wind generators of this kind are generally provided with radial blades. Air induced by the wind generator enters through the intake 3 of the fan housing 1 and leaves the fan housing through the exit orifice 4.

In the neighbourhood of the intake 3, a damper housing marked in toto by the reference 5 is secured to the wall of the housing 1 which surrounds said orifice, said damper housing being in the form of a hollow body open at one side and having its open side facing the wind generator and secured thereto. The interior 6 of the damper housing 5 is in direct communication with the intake 3 of the wind generator, the damper housing 5 surrounding and covering over the intake 3.

The damper housing 5 comprises a wall zone 7 substantially parallel to the housing wall 1 of the wind generator, and a wall zone 8 whose cross-section resembles that of an inverted U. At the bottom end of the damper housing 5 there is an air intake orifice 9 to which there is assigned at the inside, a flap 10 doing duty as the obturating element. This flap 10 closes off the air intake orifice or, depending upon the vacuum created in the interior of the housing 6, carries out a pivoting opening movement and in so doing opens the air intake to a greater or lesser extent. Because of the inherent weight, however, the opening movement does not take place until the vacuum in the inside 6 of the housing has reached a predetermined level.

The U-section wall zone 8, which is disposed perpendicularly vis-a-vis the wall of the fan housing 1, is in the form of a double wall and comprises a U-shaped internal wall 11 as well as a correspondingly shaped external wall 12 running parallel to the internal wall 11. The interspace between internal and external walls 11 and 12, is closed off at the end by the wall section 7 on the one hand and by the fan housing wall 1 on the other. By means of intermediate walls 13, 14, the interspace between internal and external walls 11, 12 is centrally divided. Two subsidiary spaces 15, 16 and 17, 18 which form secondary air ducts, communicate with one another in the upper region of the double-wall zone 8, because the partition walls 13, 14 terminate at 19 and 20 at an interval in front of the central plane 21 which is the plane of symmetry of the damper housing 5, and leave between them a passage. Whereas the secondary air ducts 16, 18 are closed off at their bottom ends at 21 and 22, the secondary air duct 15, 17 have free air intake orifices at their bottom ends, at 23, 24, through which air can flow in accordance with the indicated arrows. At 25, 26, access openings are located in the internal wall 11 of the double-walled zone 8. Air induced by the wind generator enters through the secondary orifices 23, 24, flows through the external ducts 15, 17, enters the internal ducts 16, 18 through the opening between the ends 19, 20 of the partition walls 13, 14, and passes into the interior 6 of the damper housing 5. From there, the air flows into the intake 3 of the wind generator. With this subdivision of the interspace between the internal and external walls 11, 12 of the double-walled zone 8, produced by the partition walls 13, 14, the secondary air ducts 15, 16, 17, 18 are given a relatively long length, whilst maintaining compact construction of the damper housing 5, and thus restrict sound propagation by virtue of the resistance which their labyrinthine structure presents. The air flowing into the interior 6 of the housing through the secondary air ducts 15, 16, 17, 18, encounters negligible resistance and does not itself produce any audible noise. As soon as a higher air requirement occurs and accordingly a vacuum is produced in the interior 6 of the housing which exceeds a certain predetermined level, the obturating element 10 opens so that the requisite air can flow directly via the intake 9 into the interior 6 of the housing. In this case, the inflow of air through the secondary air ducts is interrupted until, with reduction in the air requirement and therefore in the vacuum in the interior 6 of the housing, to a level below the predetermined level, the obturating element 10 closes off the intake orifice 9 again and the requisite air flows into the interior 6 of the housing through the secondary air ducts again.

It should be clearly understood that wind generators according to the present invention can equally well be used in other fields as indicated above where noiseless operation is desired or necessary.

I claim:

1. In the combination of a wind operated musical instrument and a wind generator for supplying said pressure, the improvement which comprises
    (a) a first housing having a wall defining a first air intake port,
    (b) means in said housing for producing an air flow into the housing through the first intake port,
    (c) an air discharge port in said air flow producing means,
    (d) a sound damper upstream of the first intake port, the damper comprising:
        (i) a second housing, the interior of which communicates with the first intake port and which housing defines a second air intake port and comprises a shell having, at least locally, a double wall defining secondary flow duct means which provides communication freely between the interior of the second housing and the exterior thereof, and
        (ii) obturating means for closing said second intake port, said means being movable under the effect of air flow produced in the second housing by the air flow producing means, from a closed condition into an open condition in which the second intake port is uncovered to an extent depending on the vacuum level produced in the interior of the second housing by said air flow, and said obturating means having a pre-load acting in the direction of closure which prevents it from opening until a predetermined vacuum level is produced in the interior of the second housing.

2. A wind generator according to claim 1, wherein the obturating means comprises a flap adapted to close the second intake port.

3. A wind generator according to claim 1, wherein the damper shell comprises partition wall means built into the double wall of the shell to extend the length of the secondary duct means.

4. A wind generator according to claim 1, wherein the secondary duct means has a form selected from the group consisting of serpentine and labyrinthine.

5. A wind generator according to claim 1, wherein the second housing comprises a box open at one side and having the open side facing the first housing in the region of the first intake, said box closing off said first intake port and providing said double wall, the double wall being disposed normally vis-a-vis said wall of the first housing and having a U-section which has downwardly extending legs and the second intake being arranged horizontally between the ends of the downwardly extending legs of the U-section.

6. A wind generator according to claim 5, wherein the obturating means comprises a weighted flap adapted to close the second intake port and the flap is located on the side of the second intake port facing the interior of the second housing.

7. A wind generator according to claim 1, wherein the secondary air duct means is disposed symmetrically vis-a-vis a transverse central plane of the second housing.

8. A wind generator according to claim 1, wherein all surfaces of the second housing which delimit flow of air comprise sound-damping material.

9. In the combination of a wind operated musical instrument and a wind generator for supplying said wind operated musical instrument with air under superatmospheric air, the improvement which comprises a damper, said damper comprising (i) a housing the interior of which communicates with and air intake port of the wind generator and which housing itself defines another air intake port, and comprises a shell having, at least locally, a double wall defining secondary flow duct means which provides communication freely between the interior of the housing and the exterior thereof, and (ii) obturating means for closing the air intake port of the housing of the damper, said obturating means being adapted to be movable under the effect of air flow produced in the housing from a closed condition into an open condition in which the damper intake port is uncovered to an extent depending on the vacuum level produced in the interior of the housing by said air flow, and said obturating means having a pre-load in the direction of closure which prevents it from opening until a predetermined vacuum level is produced in the interior of the housing.

References Cited

UNITED STATES PATENTS

| | | | |
|---|---|---|---|
| 1,613,322 | 1/1927 | Goetz | 181—45 |
| 3,003,384 | 10/1961 | Kikugawa | 84—355 |
| 2,722,152 | 11/1955 | Gobbi | 84—355 |
| 3,049,960 | 8/1962 | Tannini | 84—355 |

RICHARD B. WILKINSON, Primary Examiner

L. R. FRANKLIN, Assistant Examiner

U.S. Cl. X.R.

181—35 A, 53, 643